July 7, 1964

D. A. GARRETT 3,140,002

LOG STACKER ATTACHMENT FOR TRACTOR VEHICLES

Filed July 17, 1961

INVENTOR.
DWIGHT A. GARRETT

BY
Barnes & Seed
attys.

July 7, 1964     D. A. GARRETT     3,140,002
LOG STACKER ATTACHMENT FOR TRACTOR VEHICLES
Filed July 17, 1961     3 Sheets-Sheet 3

INVENTOR.
DWIGHT A. GARRETT

United States Patent Office 3,140,002
Patented July 7, 1964

3,140,002
LOG STACKER ATTACHMENT FOR
TRACTOR VEHICLES
Dwight A. Garrett, 711 Hiway 410, Enumclaw, Wash.
Filed July 17, 1961, Ser. No. 125,047
13 Claims. (Cl. 214—147)

This invention relates to log stackers, and pertains especially to a stacker for logs of small diameter and uniform length such, for example, as those which are cut and bucked for use in pulp mills.

The general object of the invention is to provide a stacker of this type for use on wheeled or crawler vehicles which is of simple and inexpensive construction, which is unusually rugged, and which is especially efficient in the performance of the work for which it is particularly intended, and namely picking up pulp logs from a log yard, moving the same within the yard to a stacking station, and there unloading the same onto a stack, all without need of hand labor.

A further object is to provide a log stacker having a greater log-carrying capacity than mobile stackers heretofore devised, and also one which carries its load in immediate proximity to the vehicle proper so as to bring the weight center close to the adjacent ground wheels and thus minimize any tendency of the load to overbalance the vehicle.

It is a further object to provide a stacker incorporating a jaw which acts as a keeper for the load during the operation of carrying a load and which additionally performs two important functions, one that of a bull-dozer and the other that of a pusher blade during operations of positioning yarded logs preparatory to picking up the same for transport to a stack.

A yet additional object is to provide a log stacker which enables the logs to be set onto a stack one at a time.

The invention further aims to provide a tractor-stacker combination in which the tractor is of the type illustrated in pending application for Letters Patent of the United States filed March 8, 1960, Ser. No. 13,580, now Patent No. 3,049,186, and namely one in which two-wheeled front and rear frame sections articulate for swing motion about a vertical axis, permitting the section to which the stacker is attached to be swung laterally in either direction when unloading logs onto a stack and thereby enabling the operator to place the logs in precise positions upon the stack.

As a still additional object the invention aims to provide a log stacker embodying log-clamping jaws which enable selected logs to be picked up individually where, for example, the size or species of a given log dictates that the same be separated from other logs which have been deposited in a yard.

The invention has the yet further object of providing a log stacker all the movements of which are performed by hydraulic power, and which may be easily controlled, from the driver's station, by the operator of a tractor to which the stacker is attached.

The invention has the still further and important object of providing simple and effective means by which to restrain the frame of a tractor to which the stacker is attached from movement relative to the axial center of the ground wheels during periods when the stacker is being used.

These and other still more particular objects and advantages of the invention will appear and be understood in the course of the following description and claims, the invention consisting in the novel construction and in the adaptation and combination of parts hereinafter described and claimed.

In the accompanying drawings:

FIGURE 1 is a view in side elevation representing by full lines a log stacker attachment constructed to embody preferred teachings of the present invention, shown attached to a tractor which is portrayed fragmentarily in phantom. Broken lines are also used to illustrate the stacker in an elevated position, and a jaw element thereof both in a loading position and in the log-keeper position which is also portrayed by full lines.

Figure 1:
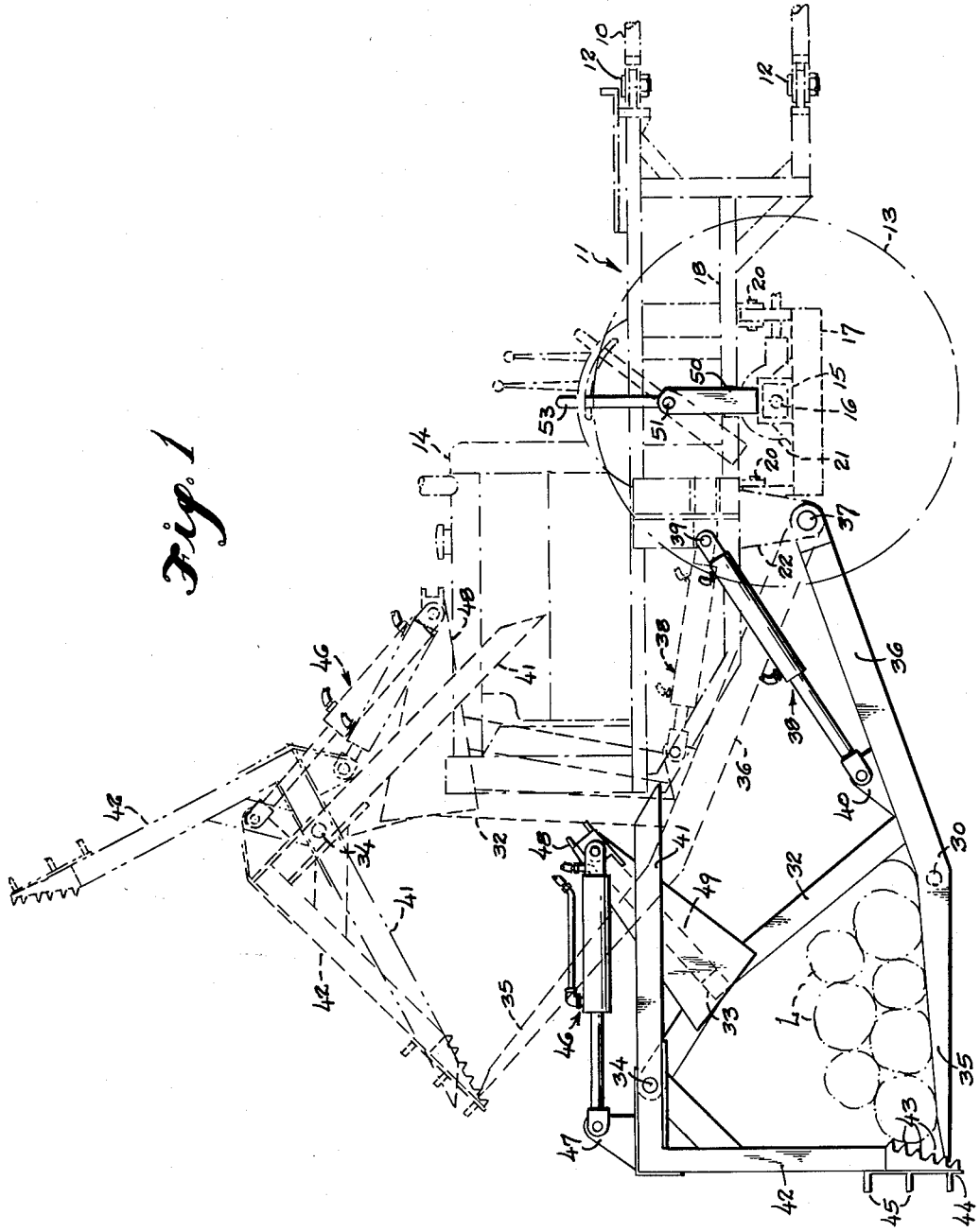
Figure 2:
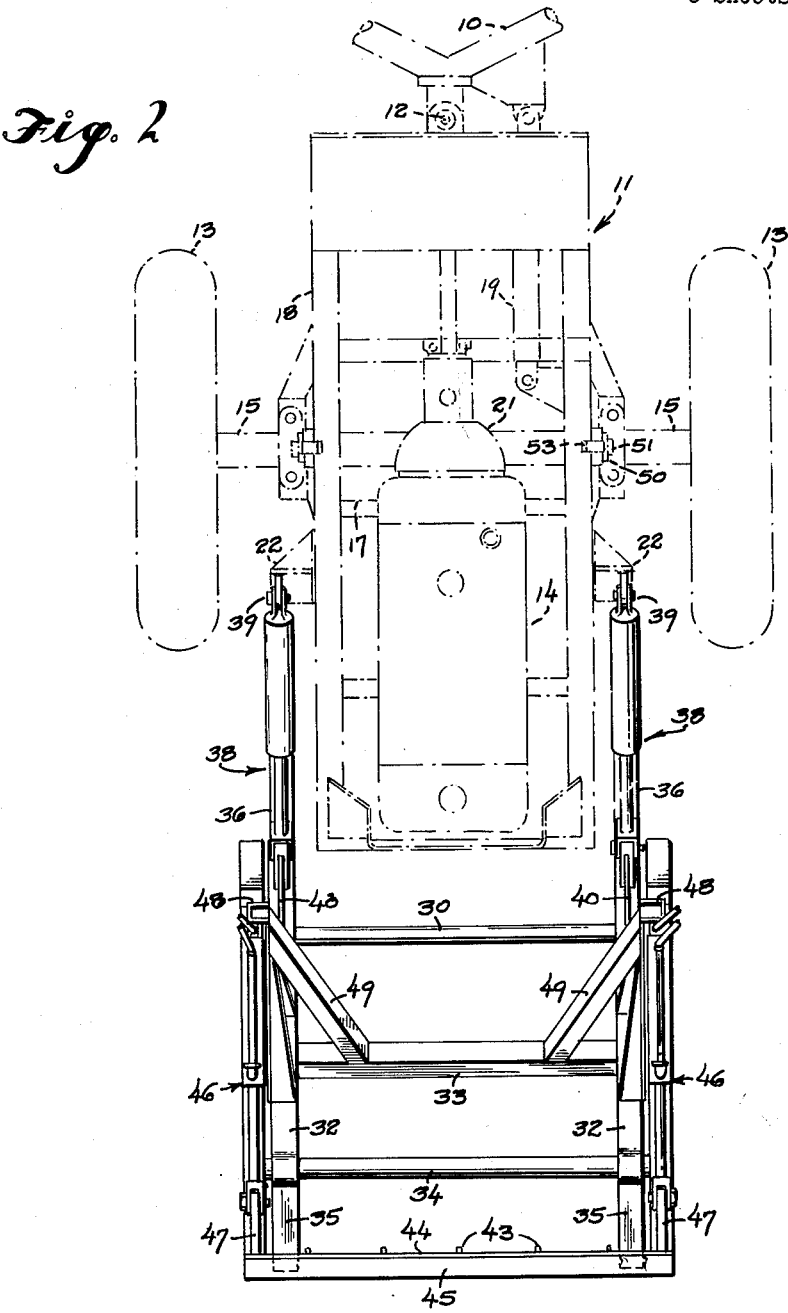
FIG. 2 is a top plan view thereof.
Figure 3:
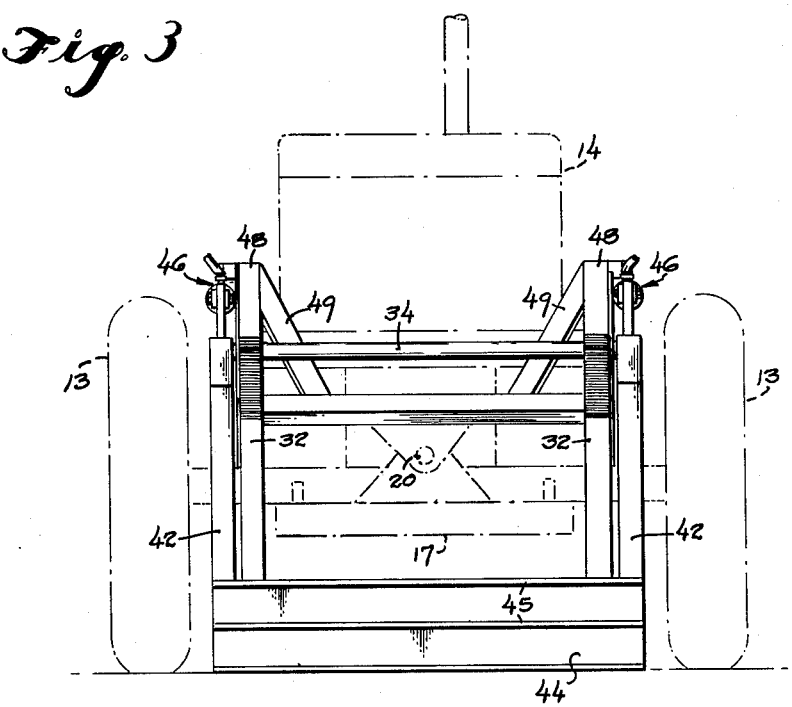
FIG. 3 is a front elevational view.

The tractor to which the present stacker is applied is desirably of the type illustrated and described in my co-pending application for patent filed March 8, 1960, Ser. No. 13,580, and namely a tractor having an articulated frame comprised of front and rear 2-wheeled sections made to swing one in relation to the other about the vertical axis of a connecting king-pin located between the sections. This character of tractor particularly adapts itself to the stacker in that it permits the wheels of the front section, to which the stacker is attached, to be swung in either direction about the center of the king-pin as a localized axis. The portrayed fragmentary portion of a frame for the rear section of such tractor is designated by the numeral 10, and co-axial king-pins which pivotally connect such rear section with the front section 11 are indicated at 12. 13 designates the ground wheels for such front section, and 14 a power plant supported thereby which drives both the front wheels and the rear wheels (not shown). Steering is accomplished by a double-acting hydraulic ram-cylinder assembly 19 which swings the two frame sections, one relative to the other, about the center of said king-pin as an axis. It is a characteristic of the front section that housings 15 for the live axle 16 which drives the ground wheels 13 are made rigid with and extend laterally from a cradle 17. This cradle underlies the main frame 18 of the section and is pivoted thereto for rocker motion about a horizontal axis lying on the longitudinal median line of the section. Pivot pins 20 produce this oscillatory mounting, with one such pin lying to the front and a second such pin lying to the rear of a differential 21 through which the drive is passed to said front axle 16, the drive having been first carried from the engine to the input end of a transfer case rigid with a differential for the rear axle of the tractor.

The tractor is designed so as to adapt the same to the detachable mounting of selected front end attachments, and for such mounting provides at each side of the frame 18 a respective hanger 22 located to the front of the front axle and depending from said frame as an integral part thereof.

The particular attachment to which the present invention pertains provides a reach which is or may be fabricated from suitable metal stock with the parts welded to produce a rigid structure. This reach provides two parallel spaced side bars joined by a cross member 30. A respective standard 32 foots upon each of the side bars at approximately the mid-length thereof. The standards extend diagonally forwardly so as to overhang the free ends of the side bars, defining an angular maw or throat of approximately 60° therebetween, and are connected intermediate the height by a cross member 33. A pipe 34 also extends between said standards, being located at the free extremities thereof and projecting at each side laterally beyond the standards to form pivot mountings for laterally spaced side members of a sweep-frame, hereinafter to be described.

The two said side bars of the reach may be said to be divided by the standards so as to form a forked load-carrying deck 35 at the front and a mounting harness 36 at the rear. The arm components of said harness are removably attached to a respective one of the two hangers 22 by co-axial pivot pins 37. The reach is raised and lowered by double-acting hydraulic ram-cylinder assemblies 38, one at each of the two sides, extending between frame mountings 39 of the front frame 18 and an ear 40 surmounting a respective said harness arm adjacent the footing end of the related standard. The fork arms of the loading deck desirably taper to a substantial point, as viewed in side elevation, in order to facilitate penetrations below or between objects which are to be picked up and such, for example, as pulp logs for which the stacker finds especial usefulness.

Reverting now to a description of the sweep-frame, each of its said side members has an elbow shape and occupies a position immediately to the outside of a related one of the two standards. In the normal position in which the sweep-frame is shown by full lines in FIG. 1, one arm 41, hereinafter termed an unloading arm, occupies a horizontal position and engages the pivot-forming end of the cross-pipe 34 at a point proximate to but spaced from the forward end. The root juncture with the other arm 42 occurs at said forward end. The free end of arm 41 has a length approximating the distance from the pivot 34 to the footing end of the standard.

The arm 42, hereinafter termed a loading arm, depends from the root end of the unloading arm approximately at right angles thereto and has a length moderately longer than the vertical rise of the standards, or which is to say the distance measured perpendicular to the deck 35 between said deck and the upper ends of the standards. At its free lower end each loader arm 42 has a serrated back face 43 and is joined one arm to the other arm by a cross cleat 44. The cross cleat presents to the front a series of parallel forwardly-facing work-engaging ribs 45. This ribbed cleat performs the function of a bull-dozer blade. The calls for a bull-dozer blade in connection with a log stacker are many. A landing area may require levelling. Logs deposited in a yard must also be pushed together and the ends brought into alignment preliminary to bucking. The usual procedure with the present machine is to perform different operations upon several areas of a yard concurrently. It will be particularly noted that the ends of arms 42 bear against the reach arms and hence pass bull-dozer thrusts rearwardly through the reach into the machine frame.

Considering said full line position of FIG. 1 as a closed position, and the position shown by dash and double-dot lines as an open position, the "opening" and "closing" swing motions of the sweep-frame as viewed from the vantage point of FIG. 1 are clockwise and counterclockwise, respectively. This swing action is performed by a pair of double-acting hydraulic ram-cylinder assemblies 46, each extending between a respective ear 47 surmounting a related one of the two arms 41 at the root end thereof and a respective bracket 48 which extends rearwardly from and is made rigid with a related one of the two standards. Said brackets are stiffened by diagonal braces 49.

In the use of the present log stacker, the pulp logs are gathered at a log yard into the maw or throat, usually on or adjacent ground level, by swinging the sweep-frame from open to closed position, the loading arms 42 sweeping the logs onto the forks of the loading deck, whereupon the loading arms perform a gate or keeper function. The reach is now elevated into the position shown by dash lines in FIG. 1 and the load moved to the station at which stacking is being performed. The unloading is then accomplished by lowering the reach to the existing level of the stack and the sweep-frame is swung into open position. This causes the unloading arms 41 to push the logs one at a time off the loading deck onto the stack. Should it be necessary to shift the loading deck laterally to properly position the logs being discharged upon the stack, this is readily accomplished, as previously described, by activating the ram-cylinder assembly 19 to swing the front section 11.

It should be noted that individual logs can be securely gripped between the serrated jaws 43 of the arms 42 and the ends of the deck forks 35. It is also to be particularly noted that when the reach is elevated to the carrying position shown by dash lines in FIG. 1, a load of logs on the loading deck lie immediately adjacent the radiator so that there is a minimal overhang of the load weight beyond the tractor proper. Further of importance is that the swing arc of the free end of the stacker causes such free end to recede toward the vehicle and hence obviates any need for backing the tractor, before lifting the load, to obtain clearance.

Figure 4:
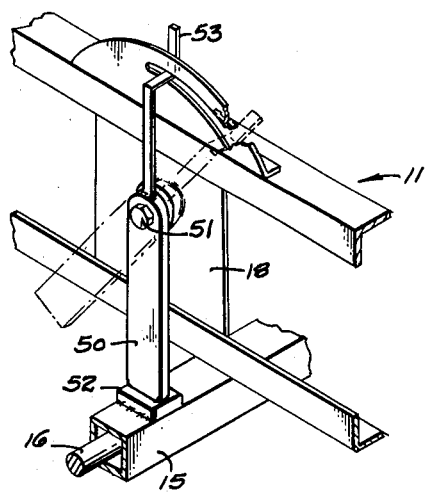
FIG. 4 is a fragmentary large-scale perspective view detailing the structure which enables the tractor frame to be localized in relation to the rotary center of the vehicle's ground wheels.

The significance of the mechanism which I have detailed in FIG. 4 may now be pointed out. To preclude jouncing of the logs when moving a load within a yard from a loading station to a stacking station, it is desirable that the vehicle frame to which the stack is attached be held against motion with respect to the axle housing which carries the road wheels. This I accomplish by providing upon each side of the vehicle frame a respective stiff-arm 50 pivoted as at 51 from the frame for swing motion in a longitudinal vertical plane between the operative and inoperative positions shown by full and broken lines, respectively, in FIG. 4. In such operating position the stiff-arm bears upon a pad 52 which is welded on the axle housing and by such bearing centers the axle housing between the latter's two limits of oscillatory swing. A longitudinal prolongation 53 of said stiff-arm provides an operating handle by which to swing the stiff-arm outwardly into its inoperative position, there being provided a catch (not shown) engaged by said handle to releasably hold the stiff-arm in such inoperative position.

It is believed that the invention will have been clearly understood from the foregoing detailed description of the illustrated preferred embodiments. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A tractor comprising a 2-wheeled rocking and a 2-wheeled non-rocking frame section disposed in tandem and articulating for swing motion, one in relation to the other, about a vertical axis located on the longitudinal median line of both sections, a cradle underlying and giving support to the rocking section and mounted for rocker motion relative thereto about a horizontal axis occupying the longitudinal median line of the section, an axle housing rigid with the cradle and extending transversely thereof, the wheels for said rocking frame being carried by the axle housing one at each of the two sides of the cradle, a reach pivoted to one of said frame sections for vertical swing motion about a transverse horizontal axis and at the free end presenting a load-carrying deck which is made a fixed part of the reach attachment so as to move bodily therewith, a standard rigid with and rising from said reach, an unloading arm pivoted to the upper end of said standard for swing motion about a transverse horizontal axis giving to the arm a sweeper motion moving across the load-carrying deck in a direction fore-and-aft thereof, a loading arm for drawing pulp logs onto the deck rigidly connected to the unloading arm and with the later providing an elbowed sweep-frame, and power means for swinging the reach and the sweep-frame independently.

2. In combination with the frame of a tractor vehicle providing a mounting bracket at each of two sides, a reach comprised of two transversely spaced arms connected by integral cross-members and pivoted at one end of each to a respective one of the two brackets for vertical swing motion of the reach about a horizontal axis extending transversely of the vehicle, and having a respective standard rising from each of said arms at a point intermediate the length with the upper ends projecting forwardly as a perch into a position overlying free ends of said arms, said free ends serving as a loading deck, power means for raising and lowering said reach, respective pairs of rigidly connected sweeper arms producing elbowed levers occupying positions one to the outside of one and the other to the outside of the other said standard fulcrumed to the perches at the approximate juncture of the two branches of the lever for reciprocal swing motion of the levers about a coinciding transverse horizontal axis, and power means for reciprocally swinging said levers, the form and positioning of said levers being such that one arm of the levers is movable in the reciprocal swing travel of the levers forwardly out of and rearwardly into a keeper position at the mouth of the loading deck and the other arm of the levers is movable forwardly into and rearwardly out of a position sweeping said deck, the form and positioning of said arms being such that the keeper arms, in the forward swing of the levers, move through a substantial part of their travel arc before the sweeper arms reach a point at which they initiate their sweeper function.

3. Structure according to claim 2, the horizontal axis about which said reach swings being so located, vertical position considered, that the free end of the reach moves directively toward a perpendicular raised from said horizontal axis throughout the greater portion of the arc travelled by said free end as the reach swings from a lowered loading position to an elevated carrying position.

4. Structure according to claim 3 in which the form and pivotal mounting of the deck is such that a load of logs occupying the deck are brought into immediate proximity of the end extremity of the vehicle proper when swung into said elevated carrying position.

5. Structure according to claim 2 in which the form and pivotal mounting of the deck is such that said loading deck occupies a steeply inclined plane, with the free end uppermost, when the reach is swung into an elevated carrying position.

6. In combination with the frame of a tractor vehicle, an attachment mounted on said frame for vertical motion relative thereto and presenting a load-carrying deck, separate means carried for the fore-and-aft movement by the attachment one forwardly out of and rearwardly into a keeper position at the outer end of the deck and the other forwardly into and rearwardly out of a position sweeping the deck, the keeper means comprising two transversely spaced arms pivoted from the attachment and having their free ends connected by a cross member arranged in said keeper position of the arms to bear against the outer end of the deck and function as a bull-dozer blade.

7. The structure recited in claim 6 in which the front face of such bull-dozer blade presents a plurality of vertically spaced and forwardly extending horizontal ribs to establish a grip on logs being pushed by the blade.

8. The structure recited in claim 6 in which the rear face of said bull-dozer blade presents serrated jaws arranged to act in complement with the free ends of the reach arms for clamping a log therebetween.

9. In combination with the frame of a tractor vehicle, an attachment mounted on said frame for vertical motion relative thereto and presenting a load-carrying deck, sweeper arms located one at one side and one at the other side of the deck pivoted to the attachment for reciprocal swing motion about a transverse horizontal axis, independent power means for raising and lowering said attachment and for operating the sweeper arms in said swing motion, and a respective companion arm fixedly connected to each sweeper arm to serve a keeper function for loads occupying the deck, said sweeper arms and their related keeper arms each producing an elbow-shaped lever, the two levers having their pivot axes coinciding and being arranged to swing in unison, the two arms of each lever each having a length such that the swing arc reaches at least close to the plane of the deck and being so formed and positioned that the keeper arms move in the reciprocal swing travel of the levers forwardly out of and rearwardly into a keeper position at the outer end of the deck and the sweeper arms move forwardly into and rearwardly out of a position sweeping the deck.

10. In combination with the frame of a tractor vehicle, a member formed to provide a load-carrying deck and supported from the frame for raising and lowering motions of said deck, a standard rising from the after end of the deck, and a sweep-frame comprised of two rigidly connected arms lying angular to each other so as to give the sweep-frame an elbow shape and at approximately the juncture of the two arms pivoted to the upper end of the standard for swing motion about a transverse horizontal axis between two extremes which, moving in one direction, gives to one of the two arms a sweeper motion pushing pulp logs off the load-carrying deck and, moving in the other direction, gives to the other of the two arms a loading motion drawing pulp logs onto the deck, and power means for moving the deck and for moving the sweep-frame.

11. In a pulp-log loader, a deck for receiving the logs, two arms lying one at one side and the other at the other side of the deck pivoted for swing motion about an axis lying in overhead relation to the deck and extending transversely thereof so that the arms move outwardly from and inwardly toward keeper positions at the outer end of the deck, said arms in their inward movement toward said keeper position functioning as a loader to drwa pulp logs onto the deck, and power means for moving said arms in their swing motion, the arms having their free ends connected by a cross member serving the office of a bulldozer blade to manipulate pulp logs into position for loading.

12. A pulp-log loader according to claim 11 in which the front face of said bulldozer blade presents a plurality of vertically spaced and forwardly extending horizontal ribs to establish a grip on logs being pushed by the blade.

13. The structure recited in claim 11 in which the rear face of said bulldozer blade presents serrated jaws arranged to act in complement with the free ends of the reach arms for clamping a log therebetween.

References Cited in the file of this patent

UNITED STATES PATENTS

| | | |
|---|---|---|
| 2,828,878 | LeTourneau | Apr. 1, 1958 |
| 2,833,429 | Shoemaker | May 6, 1958 |
| 2,941,612 | Bernotas | June 21, 1960 |
| 2,958,434 | Wagner | Nov. 1, 1960 |

FOREIGN PATENTS

| | | |
|---|---|---|
| 28,933 | Finland | Aug. 15, 1957 |
| 765,417 | Great Britain | Mar. 1, 1955 |